United States Patent [19]

Karow

[11] Patent Number: 4,630,309

[45] Date of Patent: Dec. 16, 1986

[54] METHOD AND APPARATUS FOR AUTOMATIC DIGITIZING OF CONTOUR LINES

[75] Inventor: Peter Karow, Hamburg, Fed. Rep. of Germany

[73] Assignee: URW Unternehmensberatung Karow Rubow Weber GmbH, Hamburg, Fed. Rep. of Germany

[21] Appl. No.: 626,106

[22] Filed: Jun. 29, 1984

[30] Foreign Application Priority Data

Jul. 4, 1983 [DE] Fed. Rep. of Germany ....... 3324012

[51] Int. Cl.⁴ .......................... G06K 9/36; G06K 9/48
[52] U.S. Cl. ......................................... 382/56; 382/21
[58] Field of Search ................... 382/56, 21; 358/263, 358/260

[56] References Cited

U.S. PATENT DOCUMENTS

| | | | |
|---|---|---|---|
| 4,020,463 | 4/1977 | Himmel | 382/21 |
| 4,087,788 | 5/1978 | Johannesson | 382/21 |
| 4,199,815 | 4/1980 | Kyte et al. | 382/56 |
| 4,513,444 | 4/1985 | Okai et al. | 382/56 |
| 4,524,454 | 6/1985 | Ejiri | 382/21 |

OTHER PUBLICATIONS

"Spline-Algorithmen zur Konstruktion qlatter Kurven und Flachen," by Dr. Helmut Spath, Published 1973.
"Ikarus: Computergesteuerte Vorlagenerstellung fur Foto-, CRT- und Lasersatz," Published 1980.

Primary Examiner—Anthony V. Ciarlante
Attorney, Agent, or Firm—Fleit, Jacobson, Cohn & Price

[57] ABSTRACT

An automatic technique and an apparatus for digitizing of line graphics, letters, etc., which includes the following steps: The image information is obtained from scanning the master and is stored in digital form and thereafter converted into vector data. The vector image is subjected to a shape recognition program and image elements, such as straight lines, sharp and rounded corners, narrow, average and shallow curves, turning points and tangential points are identified. The image elements are subjected to a spline fit. From the spline curve, as many coordinate pairs are calculated as are needed for an adequate description for the contour line, and, following the rules for the IKARUS concept, a digitized version of the contour is generated.

8 Claims, 15 Drawing Figures

DIGITIZED BY HAND

AUTOMATED DIGITIZED
BY PROGRAMS

WITHOUT FITTING INTO THE RASTER GRID

WITH FITTING INTO THE RASTER GRID

METHOD AND APPARATUS FOR AUTOMATIC DIGITIZING OF CONTOUR LINES

The present invention involves a method and apparatus for automatic digitizing in the IKARUS format of contour lines of black-and-white pictures and other line graphics.

The invention concerns a method for automatic digitizing in the IKARUS format (vgl. Typographische Monatshefte TM (1982), Number 2) of contour lines of black-and-white images and other line graphics such as letters, logotypes, signets, pictograms, vignettes, decorative images, ornaments and the like, and equipment to carry this out. In the context of this invention, a black-and-white image shall be understood as any image that exclusively consists of two different brightness levels or colors.

The need for digitizing such contours arises from the programming of drawing, engraving, milling, template-cutting, and flame cutting machines. Also, after the invention of the electronic typesetting machine (CRT machine), there is a great need for the digitizing of letters, digits and other typographical characters.

There are two previously known techniques for digitizing such contours of black-and-white images, such as letters, i.e., manual digitizing by means of a digitizer for generation in the IKARUS format, or scanning with a scanner for production of bit maps, run-length coding and vector formats.

This state of technology, and the advancement represented by this invention, are discussed below with reference to figures and tables showing digitizing of, for instance, letters. But the discussion is not restricted to this, since the invention is equally applicable to automatic digitizing of the contour lines of all other black-and-white images.

SUMMARY

An automatic technique for digitizing of line graphics, letters, etc., includes the following steps: The image information is obtained from scanning the master, e.g., a letter, and is stored in digital form with a series of permanent programs in microprocessors and microstorage. The image information is converted into vector data. The vector image is subjected to a shape recognition program in which it is analyzed by image elements, such as straight lines, sharp and rounded corners, narrow, average and shallow curves, turning points and tangential points. The image elements are subjected to a spline fit in which the intersection points of the image elements are positioned in accordance with the smallest error-square method, and the curve sections are further modified so that they will have identical x-y value pairs and the same steepness and curvature at the connection points. From the spline curve, as many coordinate pairs are calculated as are needed for an adequate description for the contour line, and, following the rules for the IKARUS concept, a digitized version of the contour is generated. Additionally, it is advantageous to calculate all special points from the spline representation, such as extreme x and y values, as well as any other intersection points between straight lines and/or curves.

An apparatus for carrying out the method is also described and claimed herein.

BRIEF DESCRIPTION OF THE FIGURES

" FIG. 9 appears as a dot map representation.

For clarify, an exaggerated, coarse, poor resolution screen is shown in FIGS. 4, 10 and 11.

DETAILED DESCRIPTION OF THE DRAWINGS

Manual digitizing, well-known due to the various CAD (Computer Aided Design) systems on the market, utilizes a digitizer (Coordinate Reader). The prior art device includes a sensor, which is connected to a computer and is moved along the contour to be digitized. Each time the cross hair of the sensor intersects a point to be digitized, the coordinates of this point, e.g., in units of 0.01 mm each, are stored by manually activating an appropriate switch.

Figure 1:
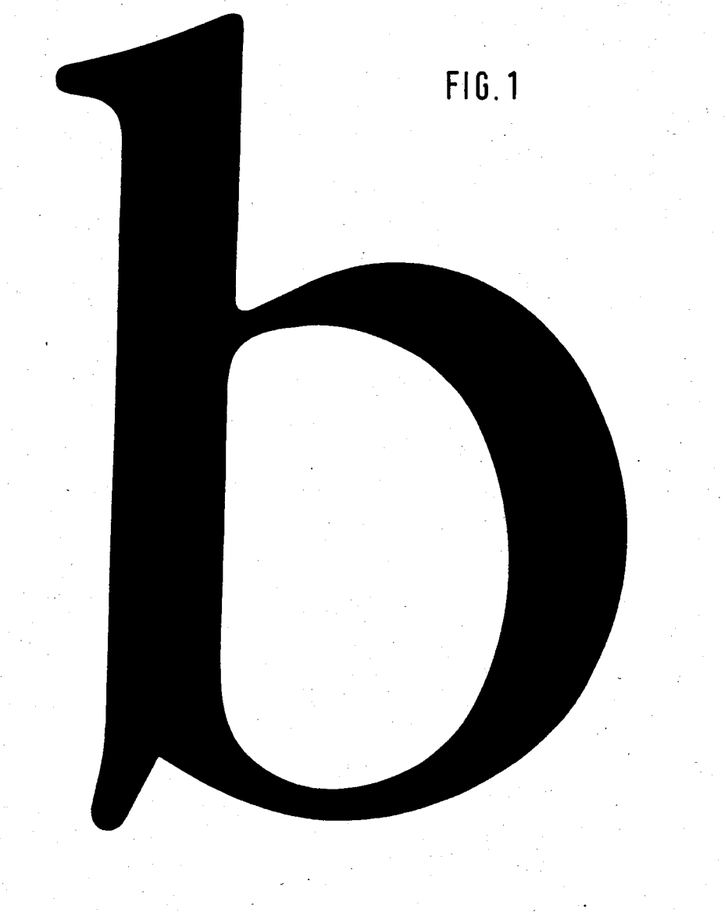
FIG. 1 shows, as an example, a black-and-white image of the letter "b."

Table 1 shows the x and y values of the contour points of FIG. 1 in one-hundredth mm and a code designation identifying the type of point for each point.

As far as factually indispensable information is concerned, the tables are complete, but redundances that are useful and/or necessary in practical application, but superfluous for the understanding of this invention, are omitted.

TABLE 1

Figure 2:
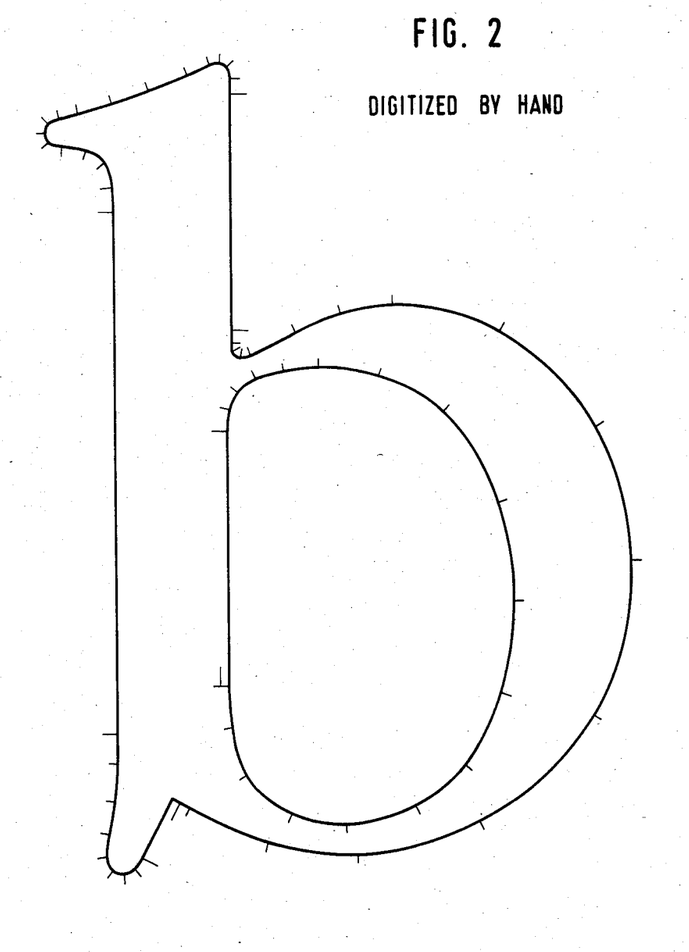
FIG. 2 is the original image of FIG. 1, marked up for digitization in accordance with the IKARUS system described below.

The Letter "b" in the IKARUS-Format as in FIGS. 1 and 2 by Manual Digitizing Method

| Point Number | Point Type | Coordinates in 1/100 mm x | y | Point Number | Point Type | Coordinates in 1/100 mm x | y |
|---|---|---|---|---|---|---|---|
| 1 | 12 | 5410 | 871 | 33 | 14 | 7167 | 10195 |
| 2 | 15 | 4760 | −389 | 34 | 14 | 8147 | 10664 |
| 3 | 14 | 4611 | −612 | 35 | 14 | 9131 | 11069 |
| 4 | 14 | 4381 | −708 | 36 | 14 | 10225 | 11247 |

TABLE 1-continued
The Letter "b" in the IKARUS-Format as in FIGS. 1 and 2 by Manual Digitizing Method

| Point Number | Point Type | Coordinates in 1/100 mm x | y | Point Number | Point Type | Coordinates in 1/100 mm x | y |
|---|---|---|---|---|---|---|---|
| 5 | 14 | 4137 | −632 | 37 | 14 | 12539 | 10689 |
| 6 | 14 | 4016 | −348 | 38 | 14 | 14652 | 8604 |
| 7 | 14 | 4072 | 121 | 39 | 14 | 15423 | 5757 |
| 8 | 14 | 4199 | 798 | 40 | 14 | 14553 | 2479 |
| 9 | 14 | 4260 | 1592 | 41 | 14 | 12015 | 307 |
| 10 | 15 | 4263 | 2199 | 42 | 14 | 9401 | −379 |
| 11 | 15 | 4263 | 13236 | 43 | 14 | 7472 | −89 |
| 12 | 14 | 4248 | 13763 | 44 | 14 | 5795 | 650 |
| 13 | 14 | 4061 | 14284 | 45 | 13 | 5410 | 871 |
| 14 | 14 | 3672 | 14525 | 46 | 12 | 6668 | 3180 |
| 15 | 14 | 3172 | 14600 | 47 | 15 | 6668 | 8568 |
| 16 | 14 | 2871 | 14706 | 48 | 14 | 6719 | 9022 |
| 17 | 14 | 2815 | 14902 | 49 | 14 | 6887 | 9379 |
| 18 | 14 | 2888 | 15104 | 50 | 14 | 7276 | 9667 |
| 19 | 14 | 3115 | 15204 | 51 | 14 | 7896 | 9842 |
| 20 | 14 | 3517 | 15301 | 52 | 14 | 8630 | 9923 |
| 21 | 14 | 4216 | 15499 | 53 | 14 | 9922 | 9705 |
| 22 | 14 | 5020 | 15760 | 54 | 14 | 11291 | 8934 |
| 23 | 14 | 5857 | 16088 | 55 | 14 | 12490 | 7011 |
| 24 | 14 | 6338 | 16291 | 56 | 14 | 12820 | 4922 |
| 25 | 14 | 6563 | 16345 | 57 | 14 | 12509 | 2977 |
| 26 | 14 | 6735 | 16279 | 58 | 14 | 11712 | 1469 |
| 27 | 14 | 6790 | 16008 | 59 | 14 | 10638 | 625 |
| 28 | 15 | 6785 | 15690 | 60 | 14 | 9161 | 259 |
| 29 | 15 | 6785 | 10723 | 61 | 14 | 7982 | 505 |
| 30 | 14 | 6783 | 10475 | 62 | 14 | 7015 | 1311 |
| 31 | 14 | 6795 | 10275 | 63 | 14 | 6713 | 2296 |
| 32 | 14 | 6964 | 10155 | 64 | 15 | 6668 | 3180 |

12 = Starting Point
13 = Corner Point
14 = Curve Point
15 = Tangential Point

The manual activation of the appropriate switch also determines what type of point is involved, e.g., starting, corner, curve or tangential point. Corner, curve and tangential points are especially important. In general, a figure consists of several closed contours. They are all equivalent to sequences of points. Starting points are used to distinguish between individual contours. Also, it is possible to use end points, or to use an index list which stores the addresses of the individual start and end points of the various contours.

For generation of a letter in the IKARUS format, the following programmable rules apply: A start point is determined for each closed contour. Usually, the corner points are preferably utilized, followed by the tangential points. If there are no such points, a curve point is selected. The positions of sharp corners are marked as corner points. The tangential transitions from curves to straight lines are classified as tangential points. The line turns, i.e., where the curvature of the line changes sign, are identified by a curve point, or, for shallow, extended turns, by two tangential points. The corner points and tangential points are joined up with straight lines. The curves are first investigated for points which are at the x and y coordinate extremities of the curve. Curve points are identified at such points. Between the x and y extremes, additional curve points are distributed after an approximately 30° change of the curvature direction. Where the shallow curves change into normal curves, or normal curves into narrow curves or round corners, two additional curve points are marked out as guiding points.

Figure 3:
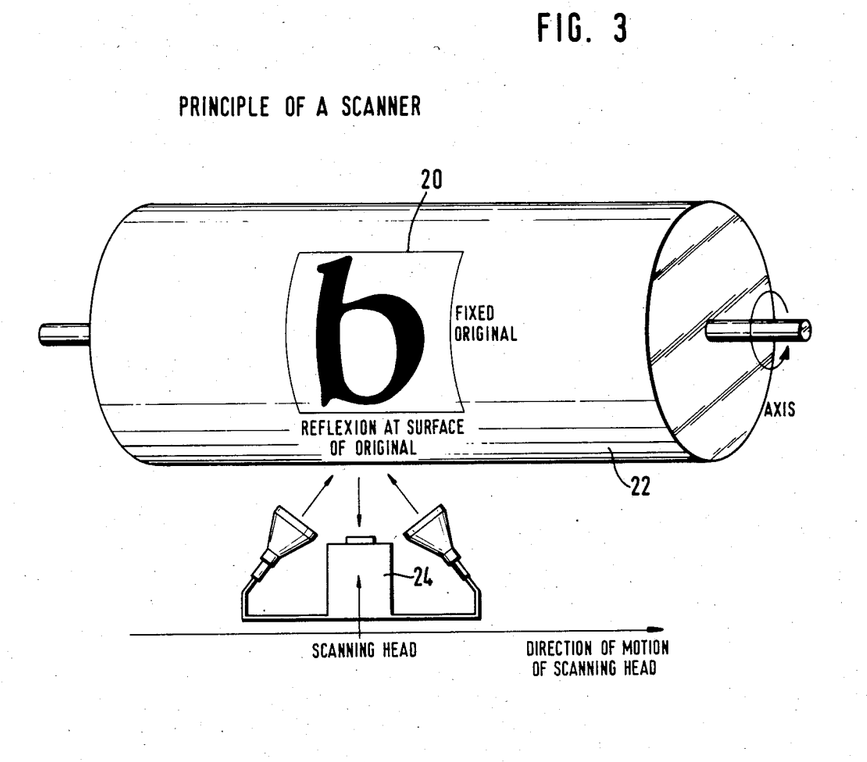
FIG. 3 shows the principle of a scanner.

Scanning is an automatic method involving a scanner for digital recording of line graphics, such as letters. This procedure is considerably cheaper than manual digitizing. For example, in FIG. 3, the black-and-white master 20 is spread out on a drum 22. When the drum revolves, the master is scanned, with the scanning equipment 24 moving parallel to the axis of rotation of the drum, scanning the master in helical lines, dot-by-dot, and recording strong light reflection (white) and weak light reflection (black).

Figure 4:
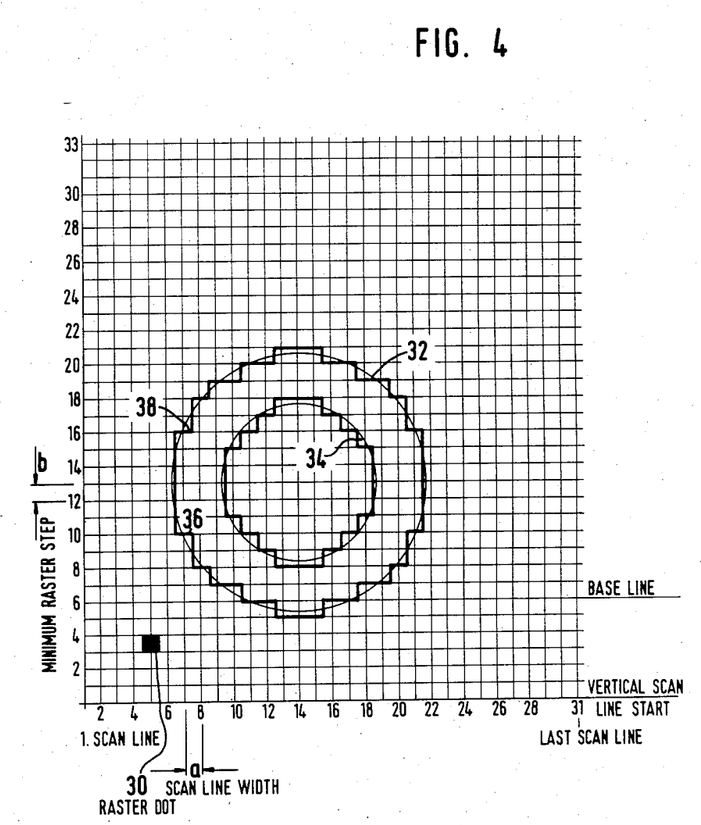
FIG. 4 illustrates the letter "o" in a scanner field for generating the running-length code noted in Table 2 in the detailed description of the drawings.

With each revolution, this produces a so-called image line, which is either stored dot-by-dot (bit mapping) by the scanner circuitry or as run-length code in order to save storage capacity. In FIG. 4, the image lines are sequentially numbered horizontally across the field. The length of an image line, i.e., the vertical aspect of the field, is smaller than the drum circumference and is divided into increments of, e.g., 0.1 mm. In FIG. 4, the minimum raster step "b" is noted. For each increment, it is determined whether the reflected light under the raster dot 30, having, e.g., 0.1 mm width, is classified as "white" or "black." A scan line width "a" is shown in FIG. 4. The number of increments which are white or black is counted, and this number is stored as white or black run-length code, as shown in Table 2 for the "o." It is to be understood that the "o" is black between circular line 32 and circular line 34. The raster dot 30 traverses each scan line and when raster dot 30 reaches line 7 and increment or step 10 (point 36 in FIG. 4), the scanner generates a "black" signal. The scanner continues to generate "black" signals until raster dot 30 reaches point 38. Thereafter a "white" signal is stored in a storage means. The run-length code identifies the transitional points, i.e., the points which signify changes from white to black or black to white. The master can always be aligned relative to the scanner in such a way that the first increment of each image line is white, and the termination of an image line can be coded with an image line end code. Also, the first scan line can be vertically aligned with the leftmost extremity of the image. In Table 2, for instance, the code 32000 has been selected as image-line end. This table provides the run-length code for the "o" in FIG. 4.

TABLE 2
Run-Length Code for FIG. 4

| Vertical Line of Letter | Code |
|---|---|
| 1 | 10,16,32000, |
| 2 | 8,18,32000, |
| 3 | 7,19,32000, |
| 4 | 7,11,15,19,32000, |
| 5 | 6,10,16,20,32000, |
| 6 | 6,9,17,20,32000, |
| 7 | 5,8,18,21,32000, |
| 8 | 5,8,18,21,32000, |
| 9 | 5,8,18,21,32000, |
| 10 | 6,9,17,20,32000, |
| 11 | 6,10,16,20,32000, |
| 12 | 7,11,15,19,32000, |
| 13 | 7,19,32000, |
| 14 | 8,18,32000, |
| 15 | 10,16,32000, |

6 "white" image lines before letter "o"
10 "white" image lines after letter "o"
31 total image lines In this table, the information 5, 8, 18, 21, 32000 is specified for the eighth vertical image line that describes the center line of the letter "o," i.e., the first change (from white to black in this case) does not occur until after the first five fields (which, as mentioned, are always white) with another change (from black to white) after the eighth field, etc.

Figure 5:
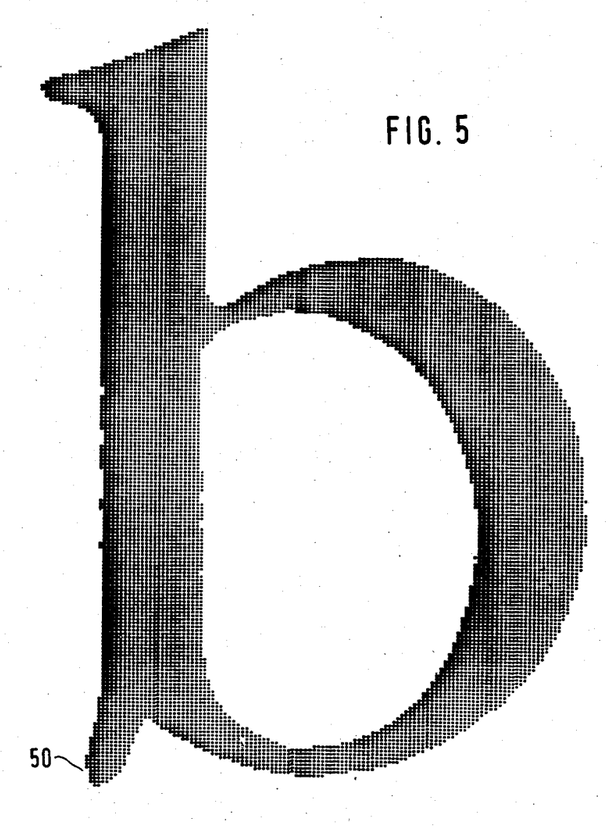
FIG. 5 is the image obtained from FIG. 1 from a bit map generated by a scanning means.

Scanning is considerably cheaper than manual digitizing, and the need for manpower is minimal. This advantage, however, has a trade-off in significantly poorer image quality, caused by the fact that the scanning is a poor technique especially for recording contours. Since the pixels in the image are not real points but small area elements, the pixels determining a contour should not appear as purely black or purely white but should contain a certain proportion of both. Where ever the "gray threshold" is established, i.e., the black content beyond which a dot is recorded as black, the contour edge will always contain pixels with a black content so close to this threshold that the normal electronic noise and unavoidable brightness fluctuations of the light source will have an effect on the sensing of adjacent contour points. Some of those contour points will be inaccurately recorded as black or white, and therefore the resulting stored image matrix will represent an irregular position sequence. As a consequence, the digitally stored contour will have an irregular, jagged appearance. FIG. 5 illustrates the letter "b" of FIG. 1 generated by scanning and reproducing the letter from the stored data from a bit map. FIG. 5 clearly illustrates the irregular contour problem.

This disadvantage of the scanner can be compensated, for instance, by using higher resolution such as 0.01×0.01 mm. Such scanners are commercially available. But they are extremely expensive and also generate large data volumes. For example, if 15×15 cm letter masters are used, 10 cm will be used for the height of the capital letters (H Height). If this master is scanned with a resolution of 0.01×0.01 mm, the result will be a bit map of 15000×15000 bits, or 225 Mbit, or about 30 Mbytes of data and about 60 KB for one run-length code. Today, this is clearly too much for storage of a single letter. The IKARUS format, however, permits storage of a capital letter with a 10 cm height at an 0.01 mm precision with an average of only 300 bytes.

The present invention provides a facility for fully automatic digitizing of letters, logotypes, signatures and other types of line graphics, which requires less manpower than normal scanning and yet provides digitizing results of similar quality as compared with manual digitizing.

The key idea in this invention involves scanning and recording image data from a master, e.g., a letter, with a conventional scanner in the form of white and black image points and to process this digitially-stored primary information in a multistage process, which can be carried out by permanent microprograms operating in accordance with the rules and protocol of the IKARUS system in arithmetic/logical units (ALU), providing a closed mathematical representation of the contour line, and then utilizing this representation of the line—in mathematical form in the ALU—to determine the coordinate pairs of an optional number of contour points. In this way, the scanning provides fully automatic digitizing all the way to digital storage of the contour line in a quality comparable to manual digitizing.

Figure 6:
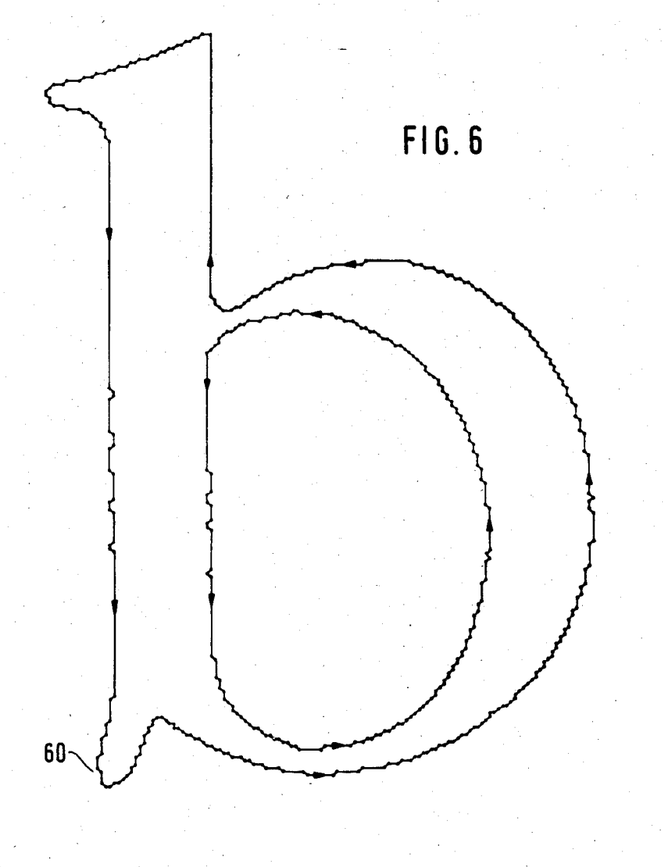
FIG. 6 is the vector representation of the information in FIG. 5, which is obtained by means of mathematical modification of the information, carried out by computers.

More specifically, a microprogram first determines the contours of the master from the black edge points of the scanner information and stores them in the form of vector formats. The black edge points are joined to each other with straight lines, forming a type of polygon pattern. FIG. 6 shows the letter "b" in vector format. The black edge point 50 of FIG. 5 is carried forward to vector image point 60 in FIG. 6.

A special embodiment of this invention makes it possible to work with masters which consist of nothing but contour lines. In the original, contour lines are drawn with specific line widths of approximately 0.3 to 0.5 mm (e.g., with a round Scriptol pen of 0.3 mm diameter).

In the scanned data, these strokes are represented by lines with a width of between 3 to 5 image dots or pixels. A skeletizing program, as provided, e.g., in the monograph "Automatische Digitalisierung mit Raster-Scannern" by Th. Kreienfels of the GMD (Gesellschaft fur Mathematik und Datenverarbeitung, Bonn), converts the data back into a vector format, so that subsequent further processing can be the same as when black-and-white masters are used.

Figure 7:
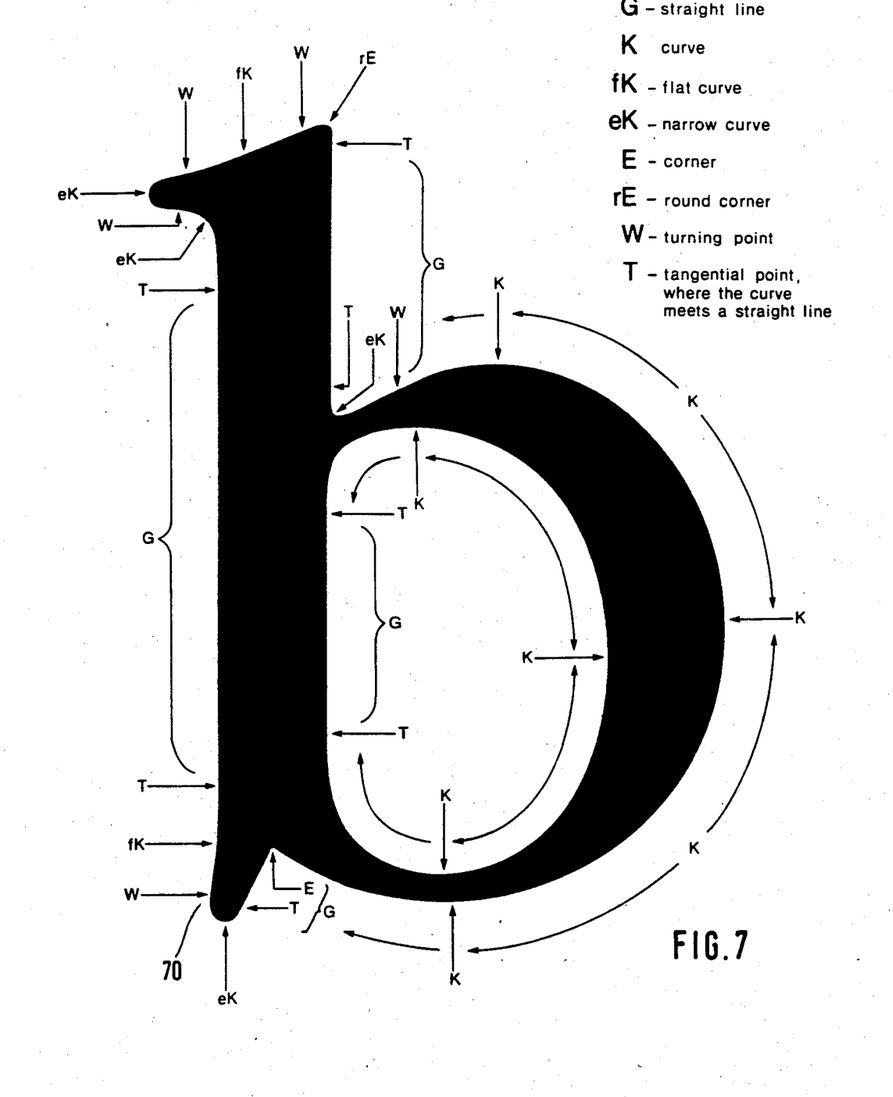
FIG. 7 is an example showing contour shaping elements.

An essential characteristic of the inventive process is that the vector format is subjected to a shape recognition program, which identifies the parts of the outline as, for instance, straight line, corner or curve. FIG. 7 identifies the type of shapes of the curves substantially similar to the IKARUS format. For example, point 70 is identified as "W" which the key on FIG. 7 classifies as a turning point.

Each of these shape elements is then subjected to the well-known mathematical technique called "Spline-Fit" as provided, e.g., in Helmut Spath: Spline-Algorithmen zur Konstruktion glatter Kurven und Flachen, R. Oldenburg-Verlag, Munich - Vienna (1973). This spline fit routine is conducted under microprogram control.

Using the closed mathematical description of the contour, the program now calculates as many coordinate pairs of contour points as are needed for adequate description of the contour line in the IKARUS format.

In the example discussed here, coordinate values for the contour points of the master to be digitized are obtained and are then compiled as in Table 3 and specified in one-hundredth mm.

TABLE 3

Figure 8:
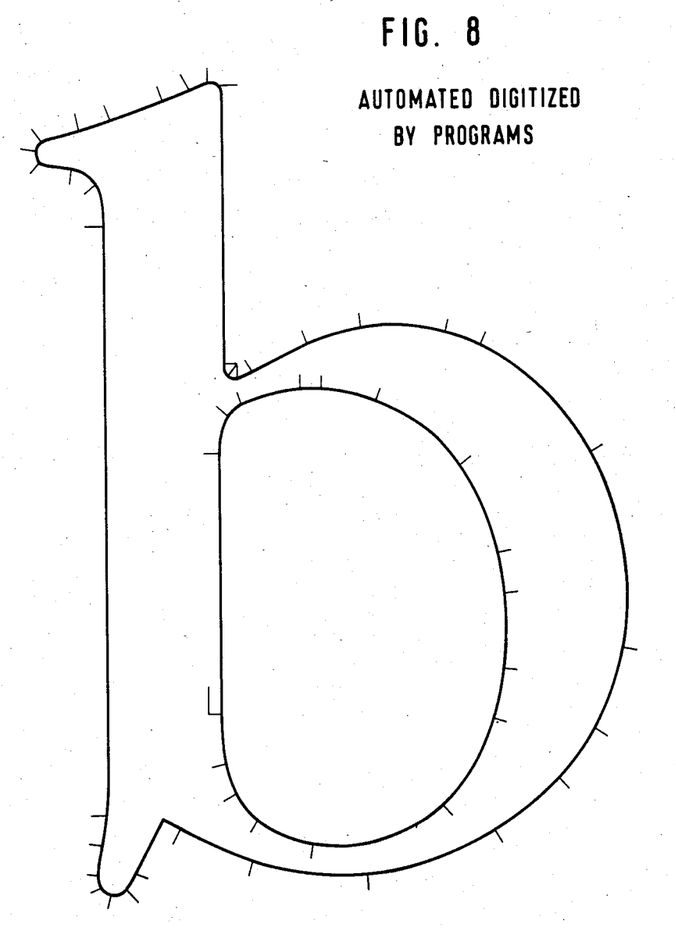
FIG. 8 is the contour of FIG. 1, which has been automatically obtained from the scanning data of FIG. 5 after processing in accordance with this invention and stored as coordinate specifics in Table 3 in the description of the drawings.

The Letter "b" in the IKARUS-Format as in FIGS. 1 and 8 in Accordance with the Present Invention

| Point Number | Point Type | Coordinates in 1/100 mm x | y | Point Number | Point Type | Coordinates in 1/100 mm x | y |
|---|---|---|---|---|---|---|---|
| 1 | 12 | 1930 | 3790 | 28 | 14 | 6510 | 10432 |
| 2 | 14 | 1570 | 3090 | 29 | 14 | 8087 | 8910 |
| 3 | 14 | 1420 | 2825 | 30 | 14 | 8535 | 6170 |
| 4 | 14 | 1150 | 2736 | 31 | 14 | 8123 | 5020 |
| 5 | 14 | 1010 | 2900 | 32 | 14 | 7610 | 4320 |
| 6 | 14 | 1011 | 3090 | 33 | 14 | 6660 | 3588 |
| 7 | 14 | 1086 | 3510 | 34 | 14 | 4820 | 2962 |
| 8 | 15 | 1150 | 3940 | 35 | 14 | 3160 | 3188 |
| 9 | 15 | 1160 | 12110 | 36 | 14 | 1930 | 3790 |
| 10 | 14 | 1060 | 12690 | 37 | 12 | 2770 | 5320 |
| 11 | 14 | 700 | 12900 | 38 | 15 | 2770 | 8960 |
| 12 | 14 | 260 | 12980 | 39 | 14 | 2914 | 9440 |
| 13 | 14 | 201 | 13170 | 40 | 14 | 3120 | 9599 |
| 14 | 14 | 288 | 13290 | 41 | 14 | 3960 | 9809 |
| 15 | 14 | 810 | 13437 | 42 | 14 | 4240 | 9811 |
| 16 | 14 | 1270 | 13572 | 43 | 14 | 5020 | 9660 |
| 17 | 14 | 2000 | 13830 | 44 | 14 | 6210 | 8770 |
| 18 | 14 | 2360 | 13981 | 45 | 14 | 6750 | 7510 |
| 19 | 14 | 2640 | 14089 | 46 | 14 | 6849 | 6950 |
| 20 | 15 | 2830 | 14030 | 47 | 14 | 6826 | 5890 |
| 21 | 15 | 2850 | 10180 | 48 | 14 | 6679 | 5190 |
| 22 | 14 | 2903 | 10020 | 49 | 14 | 5900 | 3976 |
| 23 | 14 | 3010 | 9974 | 50 | 14 | 4040 | 3417 |
| 24 | 14 | 3260 | 10075 | 51 | 14 | 3250 | 3796 |
| 25 | 14 | 4060 | 10450 | 52 | 14 | 2930 | 4200 |
| 26 | 14 | 4820 | 10669 | 53 | 14 | 2810 | 4620 |

TABLE 3-continued

The Letter "b" in the IKARUS-
Format as in FIGS. 1 and 8 in
Accordance with the Present Invention

| Point Number | Point Type | Coordinates in 1/100 mm x | y | Point Number | Point Type | Coordinates in 1/100 mm x | y |
|---|---|---|---|---|---|---|---|
| 27 | 14 | 5990 | 10598 | 54 | 14 | 2770 | 5320 |

12 = Starting Point
13 = Corner Point
14 = Curve Point
15 = Tangential Point

From these values, the contour line of FIG. 8 is obtained. In this way, the originally obtained scanning data is converted to data which represents the master with relatively great precision. Thus, the invention makes it possible to replace the laborious manual digitizing with an automatic procedure without loosing any of its advantages, and also to take full advantage of the IKARUS format.

Figure 9:
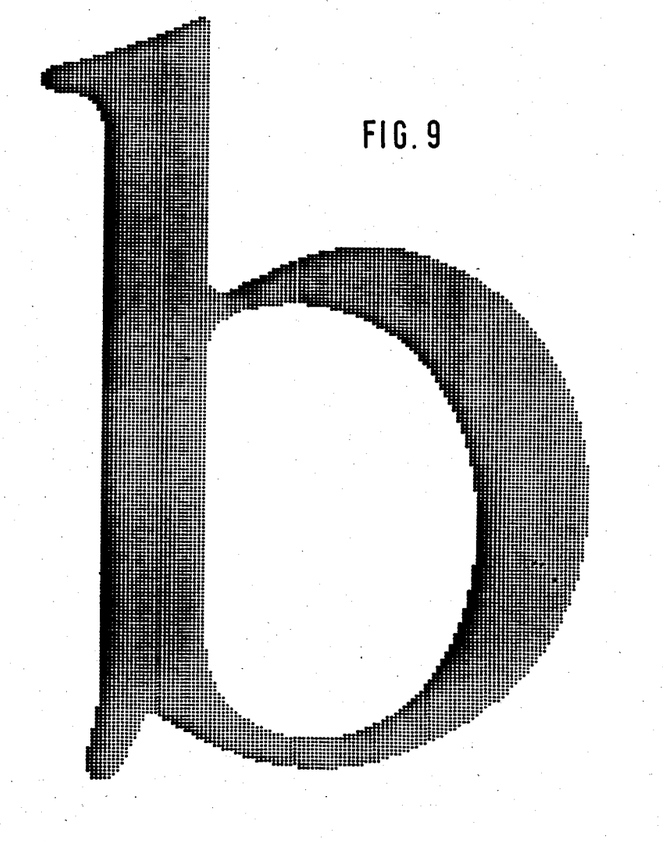
FIG. 9 shows a converted contour of FIG. 8 in accordance with an embodiment of the invention, hereinafter called "soft scanning.

The digital storage of the contour line, in accordance with, e.g., Table 3, can be directly used for several purposes, e.g., machine control of drawing, template-cutting or flame-cutting machines. However, when a high working speed is necessary, as in printing of publications, it can be useful or even necessary to first calculate the entire dot screen corresponding to the master, as shown in FIG. 9 (soft-scanning) and use it as a bit map or run-length code for control of the printing machine. Since the bit map and run-length code are completely equivalent and interchangeable for the purposes of this invention, the word "run-length code" will be used here for both concepts.

A special embodiment of the invention, called "grid fitting," makes it possible to improve the conversion of the contour into a dot screen even further. With reference to FIGS. 10 and 11, this process is described utilizing the letter "o" as an example.

Figure 10A:
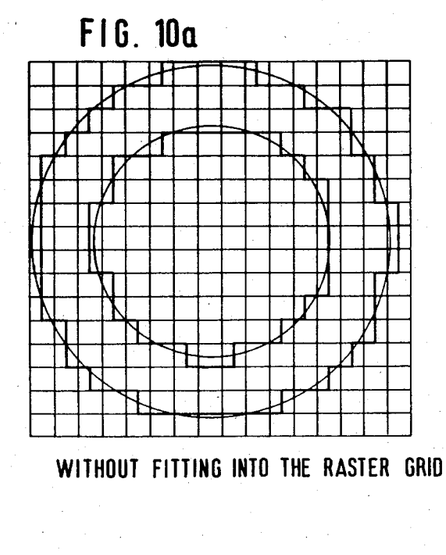
FIGS. 10 and 11 show examples of the letter "o" before and after a special application of a grid fitting method of the present invention.
Figure 10B:
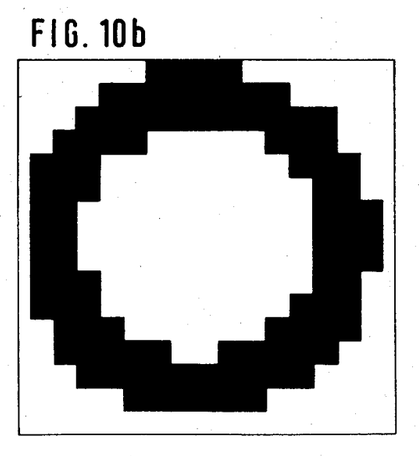

The contour to be converted into a dot screen is placed underneath an optional grid network as shown in FIG. 10a. For the purpose of this example, an exaggerated coarse grid network is used. The intersection points between the grid network, placed in an arbitrary position on top of the contour, and the actual contour is stored as scanning data (FIG. 10b). This scanning data provides a printing quality equivalent to the best available from scanning combined with a run-length code, as shown by FIG. 10b. However, the quality of the image in FIG. 10b can be improved.

Figure 11A:
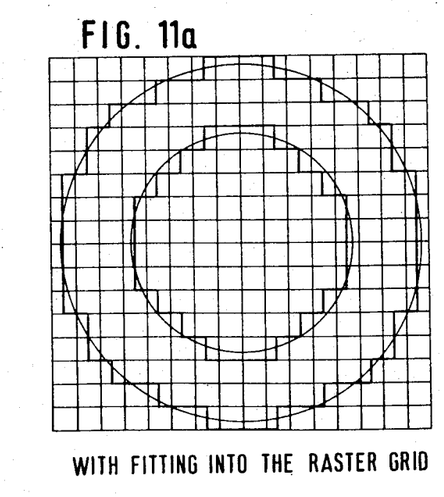
Figure 11B:
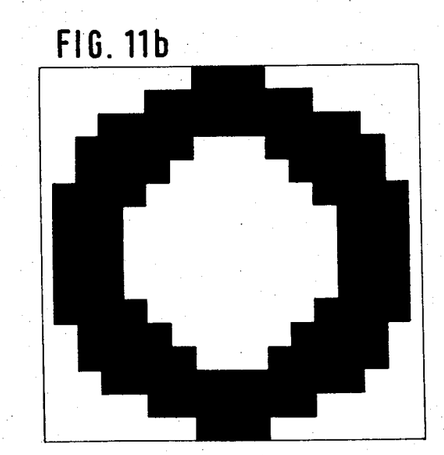

In this particular application of the invention, the contour is modified before the run-length code is calculated, so that it is displaced horizontally as well as vertically and simultaneously stretched or squeezed in such a way that the extreme values $x_{max}, x_{min}, y_{max}, y_{min}$ will occur exactly in the middle between two scanning lines, as shown in FIG. 11a. FIG. 11b shows that the intersection points of the contour line, to be stored as scanning data, provide an improved reproduction of the master, and that the horizontal and vertical shift of the contour, as well as the stretching and squeezing, rarely amounts to more than one-half scanning line width.

A preferred embodiment of the invention process, and a suitable apparatus for carrying out the process, will now be described.

EXAMPLE

Step 1: Record data with a diode line camera. In principle, this can be carried out in accordance with conventional techniques.

For instance, 2000×3000 image dots are sensed and recorded from a surface of 200 mm×300 mm, so that each image dot will correspond to an image surface of 0.1 mm×0.1 mm. The number of image dots and their dimensions can be chosen within fairly wide limits. During the scanning of the master, the line camera is moved and read out 3000 times. Each time, the 2000 diodes of the diode line in the camera supply either white or black signals in accordance with the brightness information from the 2000 area elements of the master adjacent the diodes.

Step 2: The scanning data is obtained, cf., e.g., FIG. 5, and the data is entered in the semiconductor storage by a microprocessor.

Thereafter, microprograms operate on the data in an additional arithmetic/logic unit. Each time, the data is read out from the semiconductive storage, processed and returned to storage in a converted form.

Step 3: The vector format is generated by the microprograms. Among the 2000×3000 image dots, the edge dots are selected, i.e., those that are on a contour line. The adjacent contour dots are joined to each other with a polygon pattern and stored in the vector format, e.g., FIG. 6.

Step 4: Shape recognition. The vector format is now used to classify as vector patterns the shape elements. The following shape elements are available: straight line, shallow curve, curve, narrow curve, round corner, corner, tangential point and turning point, see, e.g., FIG. 7. To some extent, the transitions from one to another are floating. The microprogram performs an iterative process and tries to find different criteria to divide the information into these elements. After several attempts, it choose, the classification that was most frequently selected.

Step 5: Spline-Fit. Each element and its two adjacent parts are subjected to the spline fit. This involves a smoothing calculation for the scanned parts of the contour in such a way that the transition points from one section of a curve to the next will not only match the x and y coordinates, but also their steepness and curvature. In addition, it provides a closed mathematical representation of the process of such elements, which makes it possible to find an exactly matching y-coordinate value for each optional x-coordinate value. This step makes it possible for the microcomputer to generate a digitized contour line with optional sensitivity.

Step 6: Generation of the IKARUS format. The spline representations of the curve sections are used to calculate characteristic points along the contour with greater precision than the scanner can record. Thus, about 25 contour points in the bit map to the left and right of a point on a curve influence this calculation. From the spline representations, the important corner dots can also be recorded with greater precision as intersection points of spline elements, e.g., between two straight lines, or one straight line and a curve, or between two curves. The IKARUS dot format can be, on an average, five times better defined than with bit map resolution, which in this example (compare Step 1) is equivalent to a precision of ±0.1 mm.

An apparatus for execution of the first process steps which avoids some of the disadvantages of conventional equipment will now be described with reference to FIGS. 12 and 13. One of the major disadvantages of the conventional type of equipment is that the illumination of the master is not uniform along the length of the illuminated lines, and also that additional variations occur in the light sensitivity of individual diodes in the camera sensor. Both of these cause considerable fluctuations in the evaluation of different image dots as black or white or belonging to a particular class of gray, even though they all have the same gray value in the master.

Figure 12:
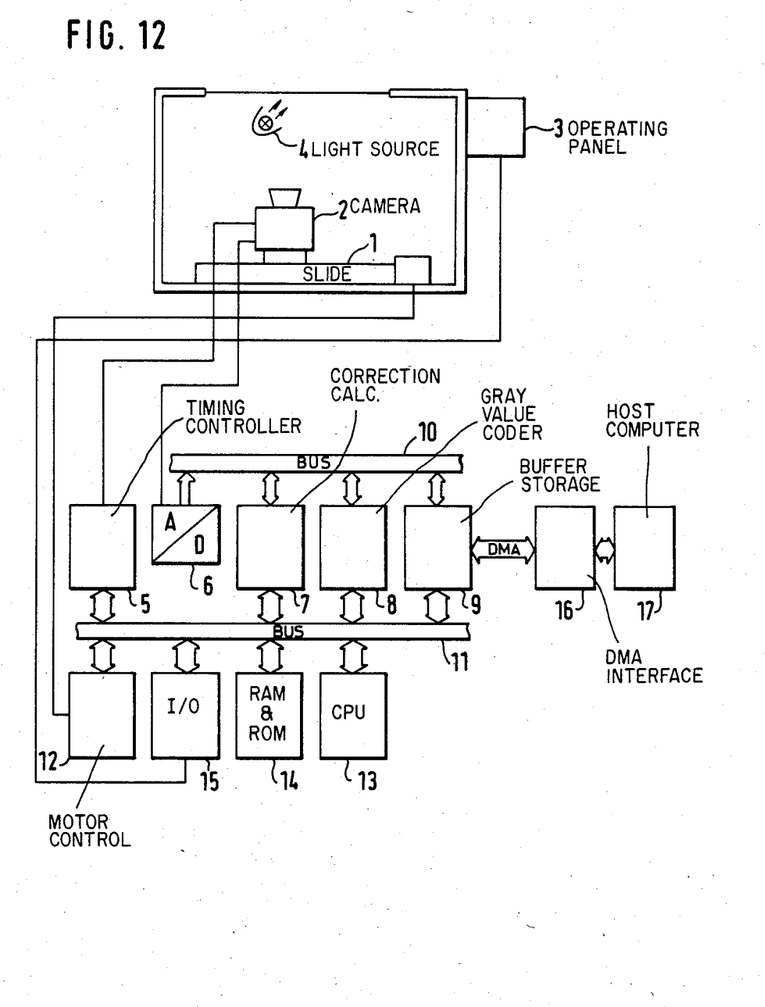
FIG. 12 is a block diagram of an apparatus in accordance with the present invention.

In FIG. 12, a precision slide 1 includes a drive unit, on which the semiconductor line camera 2 is mounted. An operating panel 3 includes a line of signal lamps and keys (not shown) which indicate the operating status of the system and permits setting of the parameters of the master to be recorded (e.g., size, brightness). A light source 4, preferably a halogen lamp, illuminates the master line-by-line. After the start of the scanning procedure, the camera 2 is continuously moved by the slide 1 and receives control signals from the timing controller 5, which determines the exposure times and decides when another line is to be recorded.

The scanning data is first obtained as an analog video signal. The analog signals are run through an analog/digital converter 6 and are digitized to a depth of, e.g., 6 or 8 bits. The digitized video signal is multiplied by a polynomial of the first degree by the correction calculator 7. The polynomial coefficients for each cell of the camera sensor have other values, to be determined separately, which takes into account both the light sensitivity of the cells and the light intensity corresponding to their geometric positions.

By this multiplication, $$S_n' = a_n + b_n \cdot S_n$$

where
$S_n$ = video signal of the individual cells of the camera
$S_n'$ = corrected video signal
$a_n, b_n$ = coefficients for cell n The errors caused by differences in the intensity of illumination and the light sensitivity of individual cells are almost completely corrected.

The scanning data is corrected and the data is compared to a preset threshold value with reference to a gray-value table 8. Depending on whether the signals are greater or lesser than this threshold value, the individual signals are coded as binary signals 1 or 0. Redundant information is removed from the resulting binary signal, using the well-known method in which areas with a substantially constant signal are omitted and only points where there is a switch or transition between 0 and 1 are stored in the bidirectional 2-port memory as run-length or transition codes.

A buffer storage 9 is used as an intermediate storage for data to be transferred by DMA (Direct Memory Access) to the host computer 17, as soon as a predetermined data volume (normally 2048 bytes) has been received through the other port from the bus line 10, serving the purpose of fast data transfer from one module to the neighboring one, i.e., from A/D converter 6 to buffer 9. The host computer controls all further processing steps, e.g., steps 2 to 6 of the example.

A bus line 11 is used for communication between all modules and for comparatively slow data transfer.

A motor control 12 provides movement commands for the slide 1. A central processing unit 13 (CPU) supervises all processes in the system and tracks down possible errors in the system and displays parameters on the operating panel 3. The various programs for CPU 13, such as control and error diagnosis, are on storage board 14, which contains the necessary RAMs (random access memory) and EPROMs (eraseable programmable read only memory).

A parallel I/O board 15 checks the keys and lamps of the operating panel 3.

The DMA interface 16 is used for fast transmission of scanning data to the storage of the host computer 17 during the recording.

Storage board 14 stores the programs for steering, or guiding, a camera 2; gray value table and data compression 8; buffer storage 9; motor guidance 12; PIO (parallel In/Out) board 15; and DMA interface 16. Most of these part programs or subprograms and corresponding circuitry are commercially available. The listed functions can be constructed or composed from such purchasable hardware and software.

Figure 13:
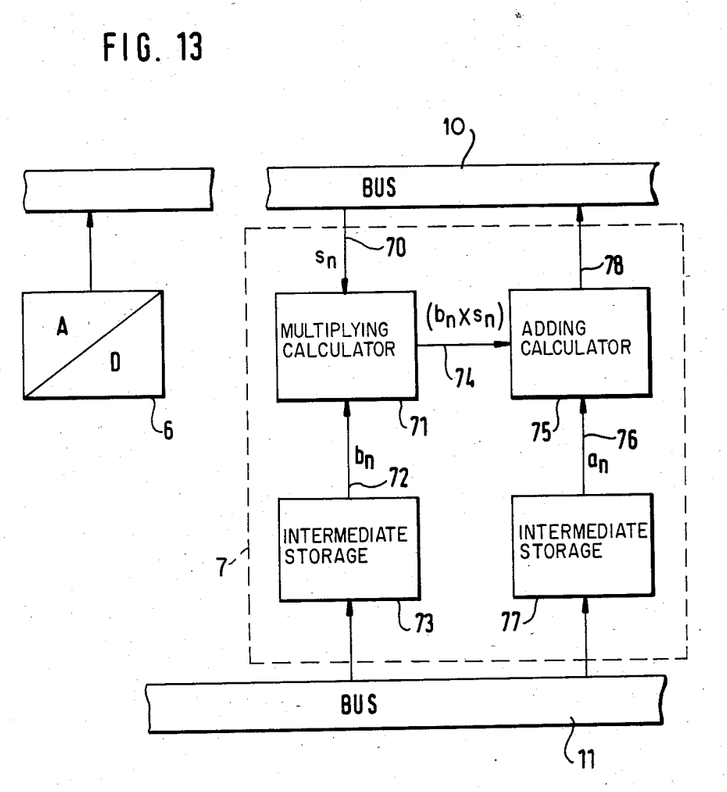
FIG. 13 shows a block diagram of correction calculator 7.

For the correction calculator 7, a special rapid circuitry is utilized as shown in FIG. 13. In this figure, A/D denotes the analog/digital converter 6; the digital values $s_n$ or the n diodes are fed via line 70 into the multiplying calculator 71, into which the corresponding correction coefficients $b_n$ are entered simultaneously via line 72. Calculator 71 performs the multiplication of the $s_n$ values with the corresponding values of $b_n$ and transfers the results via line 74 to the adding calculator 75, which receives via line 76 the corresponding correction coefficients $a_n$. The adding calculator 75 performs the addition and passes the result on the bus line 10 via line 78. Intermediate storage means 77 and 73 provide memory and data storage for $a_n$ and $b_n$ values and the intermediate computational values for calculators 71 and 75, respectively.

What is claimed is:

1. A method for automatically digitizing the contours of line graphics, letters and the like of a master utilizing microprocessors and microstorage comprising the steps of:
   scanning for initial acquisition and digitally storing the image information from the master;
   converting the image information into vector data by utilizing said microprocessors and microstorage;
   subjecting the vector data to shape recognition which classifies said vector data as straight line, curve line and corner image elements;
   spline fitting said image elements to produce contact points between each said image elements which have the same continuity in both the course of the element, the steepness of the element and the curvature of the element;
   selecting a predetermined amount of coordinate pairs of said contact points in accordance with a predetermined degree of sensitivity, the selected coordinate pairs representative of the contour of said master.

2. A method in accordance with claim 1, wherein the shape recognition step distinguishes between sharp and rounded corners, and shallow, average and narrow curves.

3. A method in accordance with claim 1, including the step of identifying additional coordinate pairs subsequent to said spline fitting step as intersection points between straight lines and turning points, and identifying extreme values for the x and y coordinates; and associating said additional coordinate pairs with the selected coordinate pairs.

4. A method in accordance with claim 1, wherein the selecting step follows the rules of the IKARUS program for determination of the representative contour points.

5. A method in accordance with claim 4, including reconverting said selected coordinate pairs into digital image information representing the contour of said master; placing the reconverted image information under an optional grid network; calculating the grid and image intersection points between the contour of the reconverted image information and the grid lines; and storing the grid fitted scanning data.

6. A method in accordance with claim 5, including the step of shifting and slightly distorting the reconverted image information so that the extreme values for the minimum and maximum x and y coordinates will occur between two adjacent scan lines.

7. An apparatus for digitizing the contours of line graphics of a master comprising:
- a moveably mounted scanning means;
- a timing controller;
- means for controlling the movement of said scanning means over said master;
- a central control computer including associated program storage means, an input/output device and a host computer, said central control computer coupled to a first bus along with said program storage means, said input/output device, said host computer and said timing controller for communication between all modules;
- a correction calculator coupled to said first bus for communication between the modules;
- a gray value table coupled to said first bus for communication;
- a buffer storage coupled to said first bus for communication;
- an analog/digital converter coupled to said scanning means;
- a second bus coupling said correction calculator, said gray value table, said buffer storage and said analog/digital converter for rapid interconnection between each other, and coupled to an interface DMA and to said host computer.

8. An apparatus according to claim 7, characterized in that the correction calculator contains a multiplying calculator, which is coupled to said second bus line and is coupled via a first intermediate storage means to said first bus line, and an adding calculator coupled to said second bus line and coupled to said first bus line via a second intermediate storage means.

* * * * *